United States Patent

Schwindeman et al.

[11] Patent Number: 6,160,054
[45] Date of Patent: *Dec. 12, 2000

[54] HETERO-TELECHELIC POLYMERS AND PROCESSES FOR MAKING SAME

[75] Inventors: James A. Schwindeman, Lincolnton; Robert J. Letchford, Cherryville; Conrad W. Kamienski, Gastonia, all of N.C.; Roderic P. Quirk, Akron, Ohio

[73] Assignee: FMC Corporation, Philadelphia, Pa.

[*] Notice: This patent is subject to a terminal disclaimer.

[21] Appl. No.: 08/687,111

[22] Filed: Jul. 18, 1996

Related U.S. Application Data

[63] Continuation-in-part of application No. 08/436,780, May 8, 1995, Pat. No. 5,565,526, and a continuation-in-part of application No. 08/878,691, Jun. 19, 1997, Pat. No. 5,792,815
[60] Provisional application No. 60/001,693, Jul. 31, 1995.
[51] Int. Cl.$^7$ ............................ C08F 297/04; C08F 8/30; C08F 8/46
[52] U.S. Cl. .................... 525/232; 525/102; 525/105; 525/113; 525/122; 525/123; 525/126; 525/177; 525/184; 525/203; 525/240; 525/241; 525/272; 525/279; 525/283; 525/291; 525/292; 525/331.9; 525/332.3; 525/338; 525/354; 525/356; 525/375; 525/385; 525/386; 525/388; 526/178; 526/180; 526/181
[58] Field of Search ................... 526/176, 178, 526/180, 181; 525/272, 232, 203, 240, 241, 331.9, 332.3, 338, 102, 105, 113, 122, 123, 126, 177, 184, 279, 283, 291, 292, 354, 356, 375, 385, 386, 388

[56] References Cited

U.S. PATENT DOCUMENTS

| | | |
|---|---|---|
| 3,326,881 | 6/1967 | Uraneck et al. . |
| 3,639,517 | 2/1972 | Kitchen et al. . |
| 3,776,964 | 12/1973 | Morrison et al. . |
| 3,842,146 | 10/1974 | Milkovich et al. . |
| 3,862,100 | 1/1975 | Halasa et al. . |
| 3,954,894 | 5/1976 | Kamienski et al. . |
| 4,039,593 | 8/1977 | Kamienski et al. . |
| 4,994,526 | 2/1991 | Peters . |
| 5,331,058 | 7/1994 | Shepherd et al. . |
| 5,362,699 | 11/1994 | Shepherd et al. . |
| 5,376,745 | 12/1994 | Handlin, Jr. et al. . |
| 5,391,663 | 2/1995 | Bening et al. . |
| 5,393,843 | 2/1995 | Handlin, Jr. et al. . |
| 5,416,168 | 5/1995 | Willis et al. . |
| 5,478,899 | 12/1995 | Bening . |
| 5,486,568 | 1/1996 | Bening et al. . |
| 5,527,753 | 6/1996 | Engel et al. ......................... 526/181 X |
| 5,565,526 | 10/1996 | Schwindeman et al. ............ 526/181 X |
| 5,600,021 | 2/1997 | Schwindeman et al. ............ 526/181 X |
| 5,612,435 | 3/1997 | Bening et al. ....................... 526/178 X |
| 5,792,815 | 8/1998 | Schwindeman et al. ............ 526/181 X |

FOREIGN PATENT DOCUMENTS

| | | |
|---|---|---|
| 0 593 049 | 4/1994 | European Pat. Off. . |
| 2 241 239 | 8/1991 | United Kingdom . |
| 2 270 317 | 3/1994 | United Kingdom . |
| WO 91/12277 | 8/1991 | WIPO . |
| 95/22566 | 8/1995 | WIPO . |

OTHER PUBLICATIONS

D.N. Schulz et al., *J. Poly. Sci. Polymer Chem.* Ed. 12, 153–166 (1974).
M. Gardette et al., *Tetrahedron* 41, 5887–5899 (1985).
J. Almena, *Tetrahedron* 51, 11883–11890 (1995).
A.J. Dias et al., *Rubber & Plastics News*, pp. 18–20 (Oct. 31, 1988).
A.J. Dias et al., *Macromolecules* 20, 2068–2076 (1987).

*Primary Examiner*—Fred Teskin
*Attorney, Agent, or Firm*—Alston & Bird LLP

[57] ABSTRACT

Hetero-telechelic polymers having the formula:

$$FG-(Q)_d-Z-J-[A(R^1R^2R^3)]_x \qquad (I)$$

wherein FG is a protected or non-protected functional group; Q is a saturated or unsaturated hydrocarbyl group derived by incorporation of a compound selected from the group consisting of conjugated diene hydrocarbons, alkenylsubstituted aromatic hydrocarbons, and mixtures thereof; d is an integer from 10 to 200; Z is a branched or straight chain hydrocarbon group which contains 3–25 carbon atoms, optionally containing aryl or substituted aryl groups; J is oxygen, sulfur, or nitrogen; $[A(R^1R^2R^3)]_x$ is a protecting group, wherein A is an element selected from Group IVa of the Periodic Table of Elements; $R^1$, $R^2$, and $R^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, with the proviso J and FG are not the same, and processes for making the same.

32 Claims, No Drawings

HETERO-TELECHELIC POLYMERS AND PROCESSES FOR MAKING SAME

CROSS-REFERENCE TO RELATED APPLICATIONS

This application claims the benefit as a continuation-in-part of prior application Ser. No. 08/436,780, filed May 8, 1995, now U.S. Pat. No. 5,565,526, and as a continuation-in-part of prior application Ser. No. 08/878,691, filed Jun. 19, 1997, now U.S. Pat. No. 5,792,815, and is related to commonly owned copending Provisional Application Ser. No. 60/001,693, filed Jul. 31, 1995, and claims the benefit of its earlier filing date under 35 U.S.C. 119(e).

FIELD OF THE INVENTION

This invention relates to novel polymers and processes for producing the same. More particularly, the invention relates novel hetero-telechelic polymers, and to processes for the anionic polymerization of olefinic-containing monomers to produce the same.

BACKGROUND OF THE INVENTION

Telechelic polymers are polymers that contain two functional groups per molecule at the termini of the polymer. Such polymers have found wide utility in many applications. For instance, telechelic polymers have been employed as rocket fuel binders, in coatings and sealants and in adhesives. In addition, polymers that contain two hydroxyl groups per molecule can be co-polymerized with appropriate materials to form polyesters, polycarbonates, and polyamides (see U.S. Pat. No. 4,994,526).

A variety of polymerization techniques, such as cationic and free radical polymerizations, have been employed to prepare telechelic polymers. However, functionality can be best controlled with anionic polymerization. An early approach to the preparation of telechelic polymers is described in D. N. Schulz, et al, *J. Polym. Sci., Polym. Chem. Ed.* 12, 153 (1974), which describes the reaction of a protected hydroxy initiator with butadiene. The resultant living anion was quenched with ethylene oxide to afford mono-protected di-hydroxy polybutadiene. While excellent functionality (f=1.87–2.02) was achieved by this process, the protected initiator was insoluble in hydrocarbon solution. Therefore, the reaction was conducted in diethyl ether, and as a result, relatively high 1,2 microstructure (31–54%) was obtained.

Another approach that has been employed to prepare telechelic polymers is the generation and subsequent functionalization of a "dilithium initiator". A dilithium initiator is prepared by the addition of two equivalents of secondary butyllithium to meta-diisopropenylbenzene. The dilithium initiator is then reacted with a conjugated diene, such as butadiene or isoprene, to form a polymer chain with two anionic sites. The resultant polymer chain is then reacted with two equivalents of a functionalizing agent, such as ethylene oxide. While useful, gelation is frequently observed during the functionalization step. This leads to lower capping efficiency (see, for example, U.S. Pat. No. 5,393,843, Example 1, wherein the capping efficiency was only 82%). Additional details of this gelation phenomenon are described in U.S. Pat. No. 5,478,899. Further, this dilithium approach can only afford telechelic polymers with the same functional group on each end of the polymer chain.

Great Britain published patent application 2,241,239, published Aug. 28, 1991, describes a novel approach for producing telechelic polymers in hydrocarbon solution. Telechelic polymers were prepared using monofunctional silyl ether initiators containing alkali metal end groups that were soluble in hydrocarbon solutions. These monofunctional silyl ether initiators were demonstrated to be useful in producing dihydroxy (telechelic) polybutadienes having desirable characteristics, such as a molecular weight of typically 1,000 to 10,000, a 1,4 microstructure content of typically 90%, and the like.

SUMMARY OF THE INVENTION

The present invention provides novel hetero-telechelic polymers and processes for preparing the same. The novel hetero-telechelic polymers of the invention can be generally described as having different functionalities at opposite ends of the polymer chain. The presence of different functionalities can provide unique properties to the polymers. Further, the hetero-telechelic polymers of the invention can be copolymerized with other monomers to provide novel copolymers possessing a wide range of useful physical properties.

Preferred hetero-telechelic polymers have the formula:

$$\text{FG}—(\text{Q})_d—\text{Z}—\text{J}—[\text{A}(\text{R}^1\text{R}^2\text{R}^3)]_x \tag{I}$$

wherein FG is a protected or non-protected functional group; Q is a saturated or unsaturated hydrocarbyl group derived by incorporation of a compound selected from the group consisting of conjugated diene hydrocarbons, alkenylsubstituted aromatic hydrocarbons, and mixtures thereof; d is an integer from 10 to 200; Z is a branched or straight chain hydrocarbon group which contains 3–25 carbon atoms, optionally containing aryl or substituted aryl groups; J is oxygen, sulfur, or nitrogen; $[\text{A}(\text{R}^1\text{R}^2\text{R}^3)]_x$ is a protecting group, in which A is an element selected from Group IVa of the Periodic Table of Elements; $\text{R}^1$, $\text{R}^2$, and $\text{R}^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, with the proviso J and FG are not the same.

The present invention also provides for the preparation of the novel hetero-telechelic polymers described above. The process of the invention includes polymerizing a monomer, including conjugated diene hydrocarbons, alkenylsubstituted aromatic hydrocarbons, and mixtures thereof, with a protected functional organometallic initiator of the formula $$\text{M}—\text{Q}_n—\text{Z}—\text{J}—[\text{A}(\text{R}^1\text{R}^2\text{R}^3)]_x \tag{II}$$

wherein M is an alkali metal, preferably lithium, n is an integer from 0 to 5, and Q, Z, J, A, $\text{R}^1$, $\text{R}^2$, $\text{R}^3$ and x are the same as defined above, to form a mono-protected, mono-functionalized living polymer. The resultant living polymer is then functionalized by reaction with a reactive or functionalizing group capable of terminating or end-capping a living polymer to provide a mono-protected or di-protected, di-functional polymer, with the proviso that the initiator and the reactive group contain different functional groups. The resultant hetero-telechelic polymer can be further reacted with other comonomers.

DETAILED DESCRIPTION OF THE INVENTION

The novel hetero-telechelic polymers of the invention can be generally described as having different functionalities at opposite ends of the polymer chain. This is represented schematically by the formula

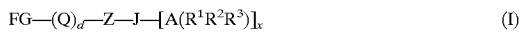

wherein A and B are different functional groups.

Preferred hetero-telechelic polymers of the present invention have the following formula:

$$FG-(Q)_d-Z-J-[A(R^1R^2R^3)]_x \qquad (I)$$

wherein FG is a protected or non-protected functional group; Q is a saturated or unsaturated hydrocarbyl group derived by incorporation of a compound selected from the group consisting of conjugated diene hydrocarbons, alkenylsubstituted aromatic hydrocarbons, and mixtures thereof; d is an integer from 10 to 200; Z is a branched or straight chain hydrocarbon group which contains 3–25 carbon atoms, optionally containing aryl or substituted aryl groups; J is oxygen, sulfur, or nitrogen; $[A(R^1R^2R^3)]_x$ is a protecting group, in which A is an element selected from Group IVa of the Periodic Table of Elements; $R^1$, $R^2$, and $R^3$ are each independently selected from the group consisting of hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen, with the proviso J and FG are not the same.

Removal of the protecting group (deprotection) produces polymers with oxygen, sulfur or nitrogen functional groups on the ends of the polymers. The residual aliphatic unsaturation can be optionally removed by hydrogenation before or after removal of the protecting groups. These functional groups can then participate in various copolymerization reactions by reaction of the functional groups on the ends of the polymer with selected difunctional or polyfunctional comonomers, as described in more detail below.

The olefinic monomer to be anionically polymerized is preferably an alkenylsubstituted aromatic hydrocarbon or a 1,3-diene. The alkenylsubstituted aromatic hydrocarbon or 1,3-diene can be chosen from the group of unsaturated organic compounds that can be polymerized anionically (i.e. in a reaction initiated by an organo-alkali metal). Examples of suitable conjugated diene hydrocarbons include, but are not limited to, 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene. Examples of polymerizable alkenylsubstituted aromatic hydrocarbons include, but are not limited to, styrene, alpha-methylstyrene, vinyltoluene, 2-vinylpyridine, 4-vinylpyridine, 1-vinylnaphthalene, 2-vinylnaphthalene, 1-alpha-methylvinylnaphthalene, 2-alpha-methylvinylnaphthalene, 1,2-diphenyl-4-methyl-1-hexene and mixtures of these, as well as alkyl, cycloalkyl, aryl, alkylaryl and arylalkyl derivatives thereof in which the total number of carbon atoms in the combined hydrocarbon constituents is generally not greater than 18. Examples of these latter compounds include 3-methylstyrene, 3,5-diethylstyrene, 4-tert-butylstyrene, 2-ethyl-4-benzylstyrene, 4-phenylstyrene, 4-p-tolylstyrene, 2,4-divinyltoluene and 4,5-dimethyl-1-vinylnaphthalene. U.S. Pat. No. 3,377,404, incorporated herein by reference in its entirety, discloses suitable additional alkenylsubstituted aromatic hydrocarbons.

The dienes or alkenylsubstituted aromatic hydrocarbons may be polymerized singly, or in admixture with each other or with other dienes or alkenylsubstituted aromatic hydrocarbons to form random or tapered copolymers, or by charging the compounds to the reaction mixture sequentially, either with each other or with other dienes or alkenylsubstituted aromatic hydrocarbons, to form block copolymers.

The hetero-telechelic polymers of the present invention are prepared by the reaction of protected functional organolithium initiators with conjugated alkadienes or alkenyl-substituted aromatic hydrocarbons, as described above, either singly, sequentially, or as mixtures thereof, to form a mono-protected mono-functional living polymer. This reaction can be in a hydrocarbon or mixed hydrocarbon-polar solvent medium, preferably at a temperature of −30° C. to 150° C.

Polymerization is followed by functionalization of the resultant living polymer with a suitable functionalizing compound or electrophile or other material as known in the art to be useful for terminating or end capping living polymers to provide a mono-protected, or di-protected, di-functional polymer. The mono-protected, or di-protected, di-functional polymer is then recovered by standard techniques. Optionally the protecting group or groups are removed to provide a di-functional polymer. The polymer is optionally hydrogenated, either before or after removing the protecting group, or before or after functionalization.

Exemplary organolithium initiators useful in the present invention include initiators selected from the group consisting of omega-(tert-alkoxy)-1-alkyllithiums, omega-(tert-alkoxy)-1-alkyllithiums chain extended with conjugated alkadienes, alkenylsubstituted aromatic hydrocarbons, and mixtures thereof, omega-(tert-alkylthio)-1-alkyllithiums, omega-(tert-alkylthio)-1-alkyllithiums chain extended with conjugated alkadienes, alkenylsubstituted aromatic hydrocarbons, and mixtures thereof, omega-(tert-butyldimethylsilyloxy)-1-alkyllithiums, omega-(tert-butyldimethylsilylthio)-1-alkyllithiums, omega-(dialkylamino)-1-alkyllithiums, omega-(dialkylamino)-1-alkyllithiums chain-extended with conjugated alkadienes, alkenylsubstituted aromatic hydrocarbons, and mixtures thereof, and omega-(bis-tert-alkylsilylamino)-1-alkyllithiums.

Initiators useful in the preparation of telechelic polymers of the present invention are also represented by the following formula:

$$M-Q_n-Z-J-[A(R^1R^2R^3)]_x \qquad (II)$$

wherein M is an alkali metal; Q is a saturated or unsaturated hydrocarbyl group derived by incorporation of a compound selected from the group consisting of conjugated diene hydrocarbons, alkenylsubstituted aromatic hydrocarbons, and mixtures thereof; n is an integer from 0 to 5; Z is a branched or straight chain hydrocarbon group which contains 3–25 carbon atoms, optionally containing aryl or substituted aryl groups; J is a hetero atom, e.g., oxygen, sulfur, or nitrogen; A is an element selected from Group IVa of the Periodic Table of Elements; $R^1$, $R^2$, and $R^3$ are independently selected from hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, and cycloalkyl and substituted cycloalkyl containing 5 to 12 carbon atoms; and x is dependent on the valence of J and varies from one when J is oxygen or sulfur to two when J is nitrogen.

These initiators (II) can be prepared by reaction of protected organolithium compounds of the following formula:

(III)

wherein each of M, Z, J, A, $R^1$, $R^2$, $R^3$, and x are the same as defined above, with conjugated alkadienes (such as butadiene or isoprene), alkenylsubstituted aromatic hydrocarbons (such as styrene or alpha-methylstyrene), and mixtures thereof, to form an extended hydrocarbon chain between M and Z in Formula (III), which extended chain is denoted as $Q_n$ in Formula (II).

The compounds of Formula (III) are prepared by first reacting in an inert solvent a selected tertiary amino-1-haloalkane, omega-hydroxy-protected-1-haloalkane or omega-thio-protected-1-haloalkane, depending on whether J is to be N, O or S, (the alkyl portions of the haloalkyl groups contain 3 to 25 carbon atoms) with an alkali metal, preferably lithium, at a temperature between about 35° C. and about 130° C., preferably at the solvent reflux temperature, to form a protected monofunctional lithium initiator (of Formula III), which is then optionally reacted with a one or more conjugated diene hydrocarbons, one or more alkenyl-substituted aromatic hydrocarbons, or mixtures of one or more dienes with one or more alkenylsubstituted aromatic hydrocarbons, in a predominantly alkane, cycloalkane, or aromatic reaction solvent, which solvent contains 5 to 10 carbon atoms, and mixtures of such solvents to produce a monofunctional initiator with an extended chain or tether between the metal atom (M) and element (J) in Formula (II) above and mixtures thereof with compounds of Formula (III). Q in Formula (II) is preferably derived from conjugated 1,3-dienes. While A in the protecting group [A($R^1R^2R^3$)] of the formulae above can be any of the elements in Group IVa of the Periodic Table of the Elements, carbon and silicon currently appear the most useful, especially when polymerizing conjugated dienes.

Incorporation of Q groups into the M—Z linkage to form the compounds of Formula (II) above involves addition of compounds of the Formula

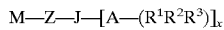

where the symbols have the meanings ascribed above, across the carbon to carbon double bonds in compounds selected from the consisting of one or more conjugated diene hydrocarbons, one or more alkenylsubstituted aromatic hydrocarbons, or mixtures of one or more dienes with one or more alkenylsubstituted aromatic hydrocarbons, to produce new carbon-lithium bonds of an allylic or benzylic nature, much like those found in a propagating polyalkadiene or polyarylethylene polymer chain derived by anionic initiation of the polymerization of conjugated dienes or arylethylenes. These new carbon-lithium bonds are now activated toward polymerization and so are much more efficient in promoting polymerization than the precursor M—Z (M=Li) bonds, themselves.

The tertiary amino-1-haloalkanes useful in practicing this invention include compounds of the following general structures:

and

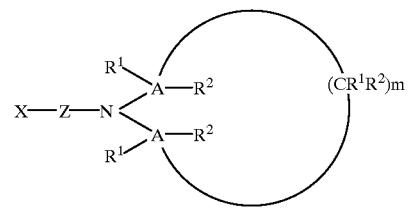

wherein X is halogen, preferably chlorine or bromine; Z is a branched or straight chain hydrocarbon tether or connecting group which contains 3–25 carbon atoms, which tether may also contain aryl or substituted aryl groups; A is an element selected from Group IVa of the Periodic Table of the Elements; $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms; and m is an integer from 1 to 7, and their employment as initiators in the anionic polymerization of olefin containing monomers in an inert, hydrocarbon solvent optionally containing a Lewis base. The process reacts selected tertiary amino-1-haloalkanes whose alkyl groups contain 3 to 25 carbon atoms, with alkali metal, preferably lithium, at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the tertiary amine initiators can be conducted in an inert solvent, preferably a non-polar solvent, optionally containing an ethereal modifier, using an olefinic monomer which is an alkenyl-substituted aromatic hydrocarbon or a 1,3-diene at a temperature of about –30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

Tertiary amino-1-haloalkanes useful in the practice of this invention include, but are not limited to, 3-(N,N-dimethylamino)-1-propyl halide, 3-(N,N-dimethylamino)-2-methyl-1-propyl halide, 3-(N,N-dimethylamino)-2,2-dimethyl-1-propyl halide, 4-(N,N-dimethylamino)-1-butyl halide, 5-(N,N-dimethylamino)-1-pentyl halide, 6-(N,N-dimethylamino)-1-hexyl halide, 3-(N,N-diethylamino)-1-propyl halide, 3-(N,N-dimethylamino)-2-methyl-1-propryl halide, 3-(N,N-diethylamino)-2,2-dimethyl-1-propyl halide, 4-(N,N-diethylamino)-1-butyl halide, 5-(N,N-diethylamino)-1-pentyl halide, 6-(N,N-diethylamino)-1-hexyl halide, 3-(N-ethyl-N-methylamino)-1-propyl halide, 3-(N-ethyl-N-methylamino)-2-methyl-1-propyl halide, 3-(N-ethyl-N-methylamino)-2,2-dimethyl-1-propyl halide, 4-(N-ethyl-N-methylamino)-1-butyl halide, 5-(N-ethyl-N-methylamino)-1-pentyl halide, 6-(N-ethyl-N-methylamino)-

1-hexyl halide, 3-(piperidino)-1-propyl halide, 3-(piperidino)-2-methyl-1-propyl halide, 3-(piperidino)-2,2-dimethyl-1-propyl halide, 4-(piperidino)-1-butyl halide, 5-(piperidino)-1-pentyl halide, 6-(piperidino)-1-hexyl halide, 3-(pyrrolidino)-1-propyl halide, 3-(pyrrolidino)-2-methyl-1-propyl halide, 3-(pyrrolidino)-2,2-dimethyl-1-propyl halide, 4-(pyrrolidino)-1-butyl halide, 5-(pyrrolidino)-1-pentyl halide, 6-(pyrrolidino)-1-hexyl halide, 3-(hexamethyleneimino)-1-propyl halide, 3-(hexamethyleneimino)-2-methyl-1-propyl halide, 3-(hexamethyleneimino)-2,2-dimethyl-1-propyl halide, 4-(hexamethyleneimino)-1-butyl halide, 5-(hexamethyleneimino)-1-pentyl halide, 6-(hexamethyleneimino)-1-hexyl halide, 3-(N-isopropyl-N-methyl)-1-propyl halide, 2-(N-isopropyl-N-methyl)-2-methyl-1-propyl halide, 3-(N-isopropyl-N-methyl)-2,2-dimethyl-1-propyl halide, and 4-(N-isopropyl-N-methyl)-1-butyl halide. The halo- or halide group is preferably selected from chlorine and bromine.

Omega-hydroxy-protected-1-haloalkanes useful in producing monofunctional ether initiators useful in practicing this invention can have the following general structure:

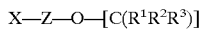

wherein X is halogen, preferably chlorine or bromine; Z is a branched or straight chain hydrocarbon group which contains 3–25 carbon atoms, optionally containing aryl or substituted aryl groups; and $R^1$, $R^2$, and $R^3$ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional ether initiators can be conducted in an inert solvent, preferably a non-polar solvent, optionally containing an ethereal modifier, using an olefinic monomer which is an alkenyl-substituted aromatic hydrocarbon cor a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The precursor omega-protected-1-haloalkanes (halides) can be prepared from the corresponding haloalcohol by standard literature methods. For example, 3-(1,1-dimethylethoxy)-1-chloropropane can be synthesized by the reaction of 3-chloro-1-propanol with 2-methylpropene according to the method of A. Alexakis, M. Gardette, and S. Colin, Tetrahedron Letters, 29, 1988, 2951. The method of B. Figadere, X. Franck and A. Cave, Tetrahedron Letters, 34, 1993, 5893, which involves the reaction of the appropriate alcohol with 2-methyl-2-butene catalyzed by boron trifluoride etherate, can be employed for the preparation of the t-amyl ethers. The alkoxy, alkylthio or dialkylamino substituted ethers, for example 6-[3-(methylthio)-1-propyloxy]-1-chlorohexane, can be synthesized by reaction of the corresponding substituted alcohol, for instance 3-methylthio-1-propanol, with an alpha-bromo-omega-chloroalkane, for instance 1-bromo-6-hexane, according to the method of J. Almena, F. Foubelo and M. Yus, Tetrahedron, 51, 1995, 11883. The compound 4-(methoxy)-1-chlorobutane, and the higher analogs, can be synthesized by the ring opening reaction of tetrahydrofuran with thionyl chloride and methanol, according to the procedure of T. Ferrari and P. Vogel, SYNLETT, 1991, 233. The triphenylmethyl protected compounds, for example 3-(triphenylmethoxy)-1-chloropropane, can be prepared by the reaction of the haloalcohol with triphenylmethylchloride, according to the method of S. K. Chaudhary and O. Hernandez, Tetrahedron Letters, 1979, 95.

Omega-hydroxy-protected-1-haloalkanes prepared in accordance with this earlier process useful in practicing this invention include, but are not limited to, 3-(1,1-dimethylethoxy)-1-propyl halide, 3-(1,1-dimethylethoxy)-2-methyl-1-propyl halide, 3-(1,1-dimethylethoxy)-2,2-dimethyl-1-propyl halide, 4-(1,1-dimethylethoxy)-1-butyl halide, 5-(1,1-dimethylethoxy)-1-pentyl halide, 6-(1,1-dimethylethoxy)-1-hexyl halide, 8-(1,1-dimethylethoxy)-1-octyl halide, 3-(1,1-dimethylpropoxy)-1-propyl halide, 3-(1,1-dimethylpropoxy)-2-methyl-1-propyl halide, 3-(1,1-dimethylpropoxy)-2,2-dimethyl-1-propyl halide, 4-(1,1-dimethylpropoxy)-1-butyl halide, 5-(1,1-dimethylpropoxy)-1-pentyl halide, 6-(1,1-dimethylpropoxy)-1-hexyl halide, 8-(1,1-dimethylpropoxy)-1-octyl halide, 4-(methoxy)-1-butyl halide, 4-(ethoxy)-1-butyl halide, 4-(propyloxy)-1-butyl halide, 4-(1-methylethoxy)-1-butyl halide, 3-(triphenylmethoxy)-2,2-dimethyl-1-propyl halide, 4-(triphenylmethoxy)-1-butyl halide, 3-[3-(dimethylamino)-1-propyloxy]-1-propyl halide, 3-[2-(dimethylamino)-1-ethoxy]-1-propyl halide, 3-[2-(diethylamino)-1-ethoxy]-1-propyl halide, 3-[2-(diisopropyl)amino]-1-ethoxy]-1-propyl halide, 3-[2-(1-piperidino)-1-ethoxy]-1-propyl halide, 3-[2-(1-pyrrolidino)-1-ethoxy]-1-propyl halide, 4-[3-(dimethylamino)-1-propyloxy]-1-butyl halide, 6-[2-(1-piperidino)-1-ethoxy]-1-hexyl halide, 3-[2-(methoxy)-1-ethoxy]-1-propyl halide, 3-[2-(ethoxy)-1-ethoxy]-1-propyl halide, 4-[2-(methoxy)-1-ethoxy]-1-butyl halide, 5-[2-(ethoxy)-1-ethoxy]-1-pentyl halide, 3-[3-(methylthio)-1-propyloxy]-1-propyl halide, 3-[4-(methylthio)-1-butyloxy]-1-propyl halide, 3-(methylthiomethoxy)-1-propyl halide, 6-[3-(methylthio)-1-propyloxy]-1-hexyl halide, 3-[4-(methoxy)-benzyloxy]-1-propyl halide, 3-[4-(1,1-dimethylethoxy)-benzyloxy]-1-propyl halide, 3-[2,4-(dimethoxy)-benzyloxy]-1-propyl halide, 8-[4-(methoxy)-benzyloxy]-1-octyl halide, 4-[4-(methylthio)-benzyloxy]-1-butyl halide, 3-[4-(dimethylamino)-benzyloxy]-1-propyl halide, 6-[4-(dimethylamino)-benzyloxy]-1-hexyl halide, 5-(triphenylmethoxy)-1-pentyl halide, 6-(triphenylmethoxy)-1-hexyl halide, and 8-(triphenylmethoxy)-1-octyl halide. The halo- or halide group is preferably selected from chlorine and bromine.

U.S. Pat. No. 5,362,699 discloses a process for the preparation of hydrocarbon solutions of monofunctional ether initiators derived from omega-hydroxy-silyl-protected-1-haloalkanes of the following general structure:

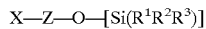

wherein X is halogen, preferably chlorine or bromine; Z is a branched or straight chain hydrocarbon group which contains 3–25 carbon atoms, optionally containing aryl or substituted aryl groups; and R¹, R², and R³ are independently defined as saturated and unsaturated aliphatic and aromatic radicals, and their employment as initiators in the anionic polymerization of olefin containing monomers in an inert, hydrocarbon solvent optionally containing a Lewis base. The process reacts selected omega-hydroxy-protected-1-haloalkanes whose alkyl groups contain 3 to 25 carbon atoms, with lithium metal at a temperature between about 25° C. and about 40° C., in an alkane or cycloalkane reaction solvent containing 5 to 10 carbon atoms and mixtures of such solvents.

Anionic polymerizations employing the monofunctional siloxy ether initiators can be conducted in an inert solvent, preferably a non-polar solvent, optionally containing an ethereal modifier, using an olefinic monomer which is an alkenylsubstituted aromatic hydrocarbon or a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

Omega-silyl-protected-1-haloalkanes prepared in accordance with this earlier process useful in practicing this invention include, but are not limited to, 3-(t-butyldimethylsilyloxy)-1-propyl halide, 3-(t-butyldimethylsilyloxy)-2-methyl-1-propyl halide, 3-(t-butyldimethylsilyloxy)-2,2-dimethyl-1-propyl halide, 4-(t-butyldimethylsilyloxy)-1-butyl halide, 5-(t-butyldimethylsilyloxy)-1-pentyl halide, 6-(t-butyldimethylsilyloxy)-1-hexyl halide, 8-(t-butyldimethylsilyloxy)-1-octyl halide, 3-(t-butyldiphenylylsilyloxy)-1-propyl halide, 3-(t-butyldiphenylylsilyloxy)-2-methyl-1-propyl halide, 3-(t-butyldiphenylylsilyloxy)-2,2-dimethyl-1-propyl halide, 4-(t-butyldiphenylylsilyloxy)-1-butyl halide, 6-(t-butyldiphenylsilyloxy)-1-hexyl halide and 3-(trimethylsilyloxy)-2,2-dimethyl-1-propyl halide. The halo- or halide group is preferably selected from chlorine and bromine.

Monofunctional thioether initiators useful in the practice of this invention can be derived from omega-thio-protected-1-haloalkanes of the following general structure:

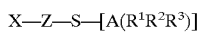

wherein X is halogen, preferably chlorine or bromine; Z is a branched or straight chain hydrocarbon group which contains 3–25 carbon atoms, optionally containing aryl or substituted aryl groups; [A(R¹R²R³)] is a protecting group in which A is an element selected from Group IVa of the Periodic Table of the Elements, and R¹, R², and R³ are independently defined as hydrogen, alkyl, substituted alkyl groups containing lower alkyl, lower alkylthio, and lower dialkylamino groups, aryl or substituted aryl groups containing lower alkyl, lower alkylthio, and lower dialkylamino groups, or cycloalkyl and substituted cycloalkyl groups containing 5 to 12 carbon atoms, and their employment as initiators in the anionic polymerization of olefin containing monomers in an inert, hydrocarbon solvent optionally containing a Lewis base. The process reacts selected omega-thioprotected-1-haloalkyls whose alkyl groups contain 3 to 25 carbon atoms, with alkali metal, preferably lithium, at a temperature between about 35° C. and about 130° C., preferably at the reflux temperature of an alkane, cycloalkane or aromatic reaction solvent containing 5 to 10 carbon atoms and mixtures of such solvents.

Anionic polymerizations employing the monofunctional thioether initiators can be conducted in an inert solvent, preferably a non-polar solvent, optionally containing an ethereal modifier, using an olefinic monomer which is an alkenylsubstituted aromatic hydrocarbon or a 1,3-diene at a temperature of about −30° C. to about 150° C. The polymerization reaction proceeds from initiation to propagation and is finally terminated with appropriate reagents so that the polymer is mono-functionally or di-functionally terminated. The polymers may have a molecular weight range of about 1000 to 10,000 but the molecular weight can be higher. Typically 5 to 50 milli-moles of initiator is used per mole of monomer.

The initiator precursor, omega-thio-protected-1-haloalkanes (halides), can be prepared from the corresponding halothiol by standard literature methods. For example, 3-(1,1-dimethylethylthio)-1-propylchloride can be synthesized by the reaction of 3-chloro-1-propanthiol with 2-methylpropene according to the method of A. Alexakis, M. Gardette, and S. Colin, Tetrahedron Letters, 29, 1988, 2951. Alternatively, reaction of 1,1-dimethylethylthiol with 1-bromo-3-chloropropane and a base affords 3-(1,1-dimethylethylthio)-1-propylchloride. The method of B. Figadere, X. Franck and A. Cave, Tetrahedron Letters, 34, 1993, 5893, which involves the reaction of the appropriate thiol with 2-methyl-2-butene catalyzed by boron trifluoride etherate, can be employed for the preparation of the t-amyl ethers. Additionally, 5-(cyclohexylthio)-1-pentylhalide and the like, can be prepared by the method of J. Almena, F. Foubelo, and M. Yus, Tetrahedron, 51, 1995, 11883. This synthesis involves the reaction of the appropriate thiol with an alkyllithium, then reaction of the lithium salt with the corresponding alpha, omega dihalide. 3-(Methylthio)-1-propylchloride can be prepared by chlorination of the corresponding alcohol with thionyl chloride, as taught by D. F. Taber and Y. Wang, J. Org, Chem., 58, 1993, 6470. Methoxymethylthio compounds, such as 6-(methoxymethylthio)-1-hexylchloride, can be prepared by the reaction of the omega-chloro-thiol with bromochloromethane, methanol, and potassium hydroxide, by the method of F. D. Toste and I. W. J. Still, Synlett, 1995, 159. T-Butyldimethylsilyl protected compounds, for example 4-(t-butyldimethylsilylthio)-1-butylhalide, can be prepared from t-butyldimethylchlorosilane, and the corresponding thiol, according to the method described in U.S. Pat. No. 5,493,044.

Omega-thio-protected 1-haloalkanes prepared in accordance with this earlier process useful in practicing this invention include, but are not limited to, 3-(methylthio)-1-propylhalide, 3-(methylthio)-2-methyl-1-propylhalide, 3-(methylthio)-2,2-dimethyl-1-propylhalide, 4-(methylthio)-1-butylhalide, 5-(methylthio)-1-pentylhalide, 6-(methylthio)-1-hexylhalide, 8-(methylthio)-1-octylhalide, 3-(methoxymethylthio)-1-propylhalide, 3-(methoxymethylthio)-2-methyl-1-propylhalide, 3-(methoxymethylthio)-2,2-dimethyl-1-propylhalide, 4-(methoxymethylthio)-1-butylhalide, 5-(methoxymethylthio)-1-pentylhalide, 6-(methoxymethylthio)-1-hexylhalide, 8-(methoxymethylthio)-1-octylhalide, 3-(1,1-dimethylethylthio)-1-propylhalide, 3-(1,1-dimethylethylthio)-2-methyl-1-propylhalide, 3-(1,1-dimethylethylthio)-2,2-dimethyl-1-propylhalide, 4-(1,1-dimethylethylthio)-1-butylhalide, 5-(1,1-dimethylethylthio)-1-pentylhalide, 6-(1,1-dimethylethylthio)-1-hexylhalide, 8-(1,1-dimethylethylthio)-1-octylhalide, 3-(1,1- dimethylpropylthio)-1-propylhalide, 3-(1,1-dimethylpropylthio)-2-methyl-1-propylhalide, 3-(1,1-dimethylpropylthio)-2,2-dimethyl-1-propylhalide, 4-(1,1-dimethylpropylthio)-1-butylhalide, 5-(1,1-dimethylpropylthio)-1-pentylhalide, 6-(1,1-dimethylpropylthio)-1-hexylhalide, 8-(1,1-dimethylpropylthio)-1-octylhalide, 3-(cyclopentylthio)-1-propylhalide, 3-(cyclopentylthio)-2-methyl-1-propylhalide, 3-(cyclopentylthio)-2,2-dimethyl-1-propylhalide, 4-(cyclopentylthio)-1-butylhalide, 5-(cyclopentylthio)-1-pentylhalide, 6-(cyclopentylthio)-1-hexylhalide, 8-(cyclopentylthio)-1-octylhalide, 3-(cyclohexylthio)-1-propylhalide, 3-(cyclohexylthio)-2-methyl-1-propylhalide, 3-(cyclohexylthio)-2,2-dimethyl-1-propylhalide, 4-(cyclohexylthio)-1-butylhalide, 5-(cyclohexylthio)-1-pentylhalide, 6-(cyclohexylthio)-1-hexylhalide, 8-(cyclohexylthio)-1-octylhalide, 3-(t-butyldimethylsilylthio)-1-propylhalide, 3-(t-butyldimethylsilylthio)-2-methyl-1-propylhalide, 3-(t-butyldimethylsilylthio)-2,2-dimethyl-1-propylhalide, 3-(t-butyldimethylsilylthio)-2-methyl-1-propylhalide, 4-(t-butyldimethylsilylthio)-1-butylhalide, 6-(t-butyldimethylsilylthio)-1-hexylhalide and 3-(trimethylsilylthio)-2,2-dimethyl-1-propylhalide. The halo- or halide group is preferably selected from chlorine and bromine.

Examples of functionalized organolithium initiators (II) include, but are not limited to, tert-alkoxy-alkyllithiums such as 3-(1,1-dimethylethoxy)-1-propyllithium and its more hydrocarbon-soluble isoprene chain-extended oligomeric analog (n=2), 3-(tert-butyldimethylsilyloxy)-1-propyllithium (n=0), tert-alkylthio-alkyllithiums such as 3-(1,1-dimethylethylthio)-1-propyllithium and its more hydrocarbon-soluble isoprene chain-extended oligomeric analog (n=2), 3-(dimethylamino)-1-propyllithium and its more hydrocarbon-soluble isoprene chain-extended oligomeric analog (n=2) and 3-(di-tert-butyldimethylsilylamino)-1-propyllithium, and mixtures thereof. Further examples of protected functionalized initiators that may be employed in this invention include, but are not limited to, 3-(1,1-dimethylethoxy)-1-propyllithium, 3-(1,1-dimethylethoxy)-2-methyl-1-propyllithium, 3-(1,1-dimethylethoxy)-2,2-dimethyl-1-propyllithium, 4-(1,1-dimethylethoxy)-1-butyllithium, 5-(1,1-dimethylethoxy)-1-pentyllithium, 6-(1,1-dimethylethoxy)-1-hexyllithium, 8-(1,1-dimethylethoxy)-1-octyllithium, 3-(1,1-dimethylpropoxy)-1-propyllithium, 3-(1,1-dimethylpropoxy)-2-methyl-1-propyllithium, 3-(1,1-dimethylpropoxy)-2,2-dimethyl-1-propyllithium, 4-(1,1-dimethylpropoxy)-1-butyllithium, 5-(1,1-dimethylpropoxy)-1-pentyllithium, 6-(1,1-dimethylpropoxy)-1-hexyllithium, 8-(1,1-dimethylpropoxy)-1-octyllithium, 3-(t-butyldimethylsilyloxy)-1-propyllithium, 3-(t-butyldimethylsilyloxy)-2-methyl-1-propyllithium, 3-(t-butyldimethylsilyloxy)-2,2-dimethyl-1-propyllithium, 4-(t-butyldimethylsilyloxy)-1-butyllithium, 5-(t-butyldimethylsilyloxy)-1-pentyllithium, 6-(t-butyldimethylsilyloxy)-1-hexyllithium, 8-(t-butyldimethylsilyloxy)-1-octyllithium and 3-(trimethylsilyloxy)-2,2-dimethyl-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 4-(ethoxy)-1-butyllithium, 4-(propyloxy)-1-butyllithium, 4-(1-methylethoxy)-1-butyllithium, 3-(triphenylmethoxy)-2,2-dimethyl-1-propyllithium, 4-(triphenylmethoxy)-1-butyllithium, 3-[3-(dimethylamino)-1-propyloxy]-1-propyllithium, 3-[2-(dimethylamino)-1-ethoxy]-1-propyllithium, 3-[2-(diethylamino)-1-ethoxy]-1-propyllithium, 3-[2-(diisopropyl)amino]-1-ethoxy]-1-propyllithium, 3-[2-(1-piperidino)-1-ethoxy]-1-propyllithium, 3-[2-(1-pyrrolidino)-1-ethoxy]-1-propyllithium, 4-[3-(dimethylamino)-1-propyloxy]-1-butyllithium, 6-[2-(1-piperidino)-1-ethoxy]-1-hexyllithium, 3-[2-(methoxy)-1-ethoxy]-1-propyllithium, 3-[2-(ethoxy)-1-ethoxy]-1-propyllithium, 4-[2-(methoxy)-1-ethoxy]-1-butyllithium, 5-[2-(ethoxy)-1-ethoxy]-1-pentyllithium, 3-[3-(methylthio)-1-propyloxy]-1-propyllithium, 3-[4-(methylthio)-1-butyloxy]-1-propyllithium, 3-(methylthiomethoxy)-1-propyllithium, 6-[3-(methylthio)-1-propyloxy]-1-hexyllithium, 3-[4-(methoxy)-benzyloxy]-1-propyllithium, 3-[4-(1,1-dimethylethoxy)-benzyloxy]-1-propyllithium, 3-[2,4-(dimethoxy)-benzyloxy]-1-propyllithium, 8-[4-(methoxy)-benzyloxy]-1-octyllithium, 4-[4-(methylthio)-benzyloxy]-1-butyllithium, 3-[4-(dimethylamino)-benzyloxy]-1-propyllithium, 6-[4-(dimethylamino)-benzyloxy]-1-hexyllithium, 5-(triphenylmethoxy)-1-pentyllithium, 6-(triphenylmethoxy)-1-hexyllithium, and 8-(triphenylmethoxy)-1-octyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium and their more hydrocarbon soluble conjugated alkadiene, alkenylsubstituted aromatic hydrocarbon, and mixtures thereof, chain extended oligomeric analogs (n=1–5).

The resultant polymer has one or more terminal functional groups having the Formula (I) described above, wherein FG is a functional group derived from reaction of the intermediate polymer with one of the functionalizing compounds described below, and d is the number of units of conjugated diene, alkenylsubstituted aromatic hydrocarbon, and mixtures thereof (including that employed originally to solubilize the initiator) and may vary from 10 to 200.

The functional polymer of Formula (I) can be further reacted with other comonomers such as di- or polyesters, di- or polyisocyanates, di-, poly-, or cyclic amides, di- or polycarboxylic acids, and di- and polyols in the presence of a strong acid catalyst to simultaneously deprotect the functional polymer and polymerize both functional ends thereof to produce novel segmented block polymers. Alternatively, the functional polymer of Formula (I) can be reacted with other comonomers in the absence of a strong acid catalyst to yield block copolymers, while maintaining the integrity of the protective group to provide a functional block copolymer. Still another alternative is to remove the protective group of the functional polymer of Formula (I) and to polymerize a functional block copolymer of the preceding sentence with the same or other comonomers to produce novel segmented block polymers.

The inert solvent is preferably a non-polar solvent such as a hydrocarbon, since anionic polymerization in the presence of such non-polar solvents is known to produce polyenes with high 1,4-contents from 1,3-dienes. Solvents useful in practicing this invention include, but are not limited to, inert liquid alkanes, cycloalkanes and aromatic solvents such as alkanes and cycloalkanes containing five to ten carbon atoms, such as pentane, hexane, cyclohexane, methylcyclohexane, heptane, methylcycloheptane, octane, decane and the like, and aromatic solvents containing six to ten carbon atoms such as toluene, ethylbenzene, p-xylene, m-xylene, o-xylene, n-propylbenzene, isopropylbenzene, n-butylbenzene, t-butylbenzene, and the like.

Polar solvents (modifiers) can be added to the polymerization reaction to alter the microstructure of the resulting polymer, i.e., increase the proportion of 1,2 (vinyl) microstructure or to promote functionalization or randomization. Examples of polar modifiers include, but are not limited to, diethyl ether, dibutyl ether, tetrahydrofuran, 2-methyltetrahydrofuran, methyl tert-butyl ether, diazabicyclo[2.2.2]octane, triethylamine, tributylamine, N,N,N',N'-tetramethylethylene diamine (TMEDA), 1,2-dimethoxyethane (glyme), alkali metal alkoxides, and amino-substituted alkali metal alkoxides. The amount of the polar modifier added depends on the vinyl content desired, the nature of the monomer, the temperature of the polymerization, and the identity of the polar modifier.

Electrophiles that are useful in functionalizing the polymeric living anion include, but are not limited to, alkylene oxides, such as ethylene oxide, propylene oxide, styrene oxide, and oxetane; oxygen; sulfur; carbon dioxide; halogens such as chlorine, bromine and iodine; haloalkyltrialkoxysilanes, alkenylhalosilanes and omega-alkenylarylhalosilanes, such as chlorotrimethylsilane and styrenyldimethyl chlorosilane; sulfonated compounds, such as 1,3-propane sultone; amides, including cyclic amides, such as caprolactam, N-benzylidene trimethylsilylamide, and dimethyl formamide; silicon acetals; 1,5-diazabicyclo [3.1.0]hexane; allyl halides, such as allyl bromide and allyl chloride; methacryloyl chloride; amines, including primary, secondary, tertiary and cyclic amines, such as 3-(dimethylamino)-propyl chloride and N-(benzylidene) trimethylsilylamine; epihalohydrins, such as epichlorohydrin, epibromohydrin, and epiiodohydrin, and other materials as known in the art to be useful for terminating or end capping polymers. These and other useful functionalizing agents are described, for example, in U.S. Pat. Nos. 3,786,116 and 4,409,357, the entire disclosure of each of which is incorporated herein by reference. The only proviso is that the initiator and the electrophile contain different functional groups, thus leading to hetero-telechelic polymers.

If desired, the protecting groups can be removed from the polymer. This deprotection can be performed either prior to or after the optional hydrogenation of the residual aliphatic unsaturation. For example, to remove tert-alkyl-protected groups, the protected polymer can be mixed with Amberlyst® 15 ion exchange resin and heated at an elevated temperature, for example 150° C., until deprotection is complete. Tert-alkyl-protected groups can also be removed by reaction of the polymer with para-toluenesulfonic acid, trifluoroacetic acid, or trimethylsilyliodide. Additional methods of deprotection of the tert-alkyl protecting groups can be found in T. W. Greene and P. G. M. Wuts, Protective Groups in Organic Synthesis, Second Edition, Wiley, New York, 1991, page 41.

Tert-butyldimethylsilyl protecting groups can be removed by treatment of the polymer with acid, such as hydrochloric acid, acetic acid, para-toluensulfonic acid, or Dowex® 50W-X8. Alternatively, a source of fluoride ions, for instance, tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pages 80–83.

In addition, protecting groups can be selectively removed from the polymers, i.e., deprotecting conditions can be selected so as to remove at least one protecting group without removing other dissimilar protecting groups by proper selection of deprotecting reagents and conditions.

The following table details representative experimental conditions capable of selectively removing protecting groups (more labile) while maintaining the integrity of other different protecting groups (more stable).

| Labile | Stable | Conditions |
| --- | --- | --- |
| t-butyldimethylsilyl | t-butyl | tetrabutylammonium fluoride |
| t-butyldimethylsilyl | t-butyl | 1 N HCL |
| t-butyldimethylsilyl | dialkylamino | tetrabutylammonium fluoride |
| t-butyldimethylsilyl | dialkylamino | 1 N HCL |
| t-butyl | dialkylamino | Amberlyst ® resin |
| t-amyl | dialkylamino | Amberlyst ® resin |
| trimethylsilyl | t-butyl | tetrabutylammonium fluoride |
| trimethylsilyl | t-butyl | 1 N HCl |
| trimethylsilyl | dialkylamino | tetrabutylammonium fluoride |
| trimethylsilyl | dialkylamino | 1 N HCl |

The progress of the deprotection reactions can be monitored by conventional analytical techniques, such as Thin Layer Chromatography (TLC), Nuclear Magnetic Resonance (NMR), or InfraRed (IR) spectroscopy.

Examples of methods to hydrogenate the polymers of this invention are described in U.S. Pat. Nos. 4,970,254, 5,166,277, 5,393,843 and 5,496,898, the entire disclosure of each of which is incorporated by reference. The hydrogenation of the functionalized polymer is conducted in situ, or in a suitable solvent, such as hexane, cyclohexane or heptane. This solution is contacted with hydrogen gas in the presence of a catalyst, such as a nickel catalyst. The hydrogenation is typically performed at temperatures from 25° C. to 150° C., with a archetypal hydrogen pressure of 15 psig to 1000 psig. The progress of this hydrogenation can be monitored by InfraRed (IR) spectroscopy or Nuclear Magnetic Resonance (NMR) spectroscopy. The hydrogenation reaction is conducted until at least 90% of the aliphatic unsaturation has been saturated. The hydrogenated functional polymer is then recovered by conventional procedures, such as removal of the catalyst with aqueous acid wash, followed by solvent removal or precipitation of the polymer.

For example, a protected functional living polymer of this invention can be generated by polymerizing 1,3-butadiene with an initiator of Formula (II) above, wherein M is lithium, Z is a trimethylene connecting group, Q is isoprene, J is sulfur, A is carbon, n is 3, and $R^1$, $R^2$, and $R^3$ are methyl groups. A living polymer is produced having the formula

$$\text{Li}-(B)_m-(Ip)_3(CH_2)_3-S-C(CH_3)_3 \quad (IV)$$

where B is a unit derived by polymerizing butadiene, m is an integer from about 10 to 200, and Ip is a unit derived by polymerization of isoprene. The living polymer (IV) may be reacted, for example, with ethylene oxide to yield, after hydrolysis, a hetero-telechelic compound of the formula

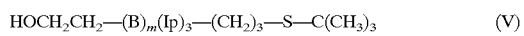

$$HOCH_2CH_2-(B)_m(Ip)_3-(CH_2)_3-S-C(CH_3)_3 \quad (V)$$

which may optionally be hydrogenated to the corresponding asymmetric polymer. Deprotection of polymer (V), for example with trifluoroacetic acid or para-toluenesulfonic acid, would generate the polymer (VI)

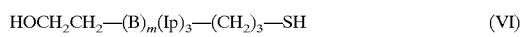

$$HOCH_2CH_2-(B)_m(Ip)_3-(CH_2)_3-SH \quad (VI)$$

which contains two different functional groups on the termini of the polymer.

Additionally, a wide variety of asymmetrically monofunctional polymers may be produced by reacting the living polymer (IV) above with various functionalizing agents. For example, addition of carbon dioxide (see *J.Polym.Sci., Polym.Chem.* 30, 2349 (1992)) to polymer (IV) would produce a polymer with one protected thiol and one carboxyl group, or the living polymer (IV) may be reacted with 1,5 diazabicyclo-(3.1.0)hexane as described in U.S. Pat. No. 4,753,991 to produce a polymer with one protected thiol and one amino group. A polymer with one protected thiol group and one protected amino group can be prepared by reaction of the living anion (IV) with a protected amino propyl bromide, see Macromolecules, 23, 939 (1990). Reaction of the living polymer anion (IV) with oxetane or substituted oxetanes (see U.S. Pat. No. 5,391,637) would afford a polymer which contained one protected thiol and a hydroxyl group. A polymer with a protected thiol and a protected hydroxy group can be prepared by reaction of the living anion (IV) with a silicon derived acetal, see U.S. Pat. No. 5,478,899.

Other asymmetrically substituted monofunctional polymers may be produced having epoxy or isocyanate groups at one end, for example, by reacting the lithium salt of (V) above (before hydrolysis), with epichlorohydrin or, by reacting (V) itself with an equivalent of a diisocyanate, such as methylene 4,4-diphenyl diisocyanate (2/1 NCO/OH). These unsymmetrically substituted monofunctional polymers could then be further reacted with other comonomers either with or without simultaneous deprotection as described below.

The protected monohydroxy polymers (V) alone and in their hydrogenated forms could be used as base materials to lend flexibility and higher impact strength in a number of formulas to produce coatings, sealants, binders and block copolymers with polyesters, polyamides and polycarbonates as described in UK Patent Application GB 2270317A and in "Polytail" data sheets and brochures (Mitsubishi Kasei America).

In the presence of acidic catalysts used to promote the formation of many of these block copolymer resins, the protective group of the hydrogenated polymer is removed as well, allowing the exposed hydroxyl grouping in the base polymer molecule to simultaneously participate in the block copolymer reaction.

For example, hydrogenated polymers (VI) may be reacted with bisphenol A and phosgene in the presence of appropriate catalysts to yield a polycarbonate alternating block copolymer. The resulting products are useful as molding resins, for example, to prepare interior components for automobiles.

A segmented polyamide-hydrogenated block copolymer is also useful as a molding composition to prepare exterior automotive components and can be prepared, for example, by reacting hydrogenated (VI) polymer with caprolactam or adipic acid and a diamine in the presence of a suitable catalyst.

A segmented polyester-hydrogenated block copolymer is produced by reaction of hydrogenated (VI) polymer with dimethyl terephthalate and a diol and a suitable acidic catalyst. Again, the products are useful as molding compounds for exterior automotive components.

Isocyanate-terminated prepolymers can be produced from hydrogenated (VI) polymers by reaction with suitable diisocyanates (2/1 NCO/OH) as above and which can be further reacted with diols and additional diisocyanates to form segmented polyurethanes useful for water based, low VOC coatings. Inclusion of acid functional diols, such as dimethylolpropionic acid, in the polyurethane introduces pendant carboxyl groups which can be neutralized with tertiary amines to afford water dispersable polyolefin/polyurethane segmented polymers, useful for water based coatings. This same principle could be applied to acrylic polymers made with tertiary amine functional monomers included, which could be made by free radical polymerization following reacting the hydroxyl groups at the terminal ends of the polymer with acryloyl chloride or methacryloyl chloride. Segmented polyurethane prepolymers may be mixed with tackifying resins and used as a moisture-curable sealant, caulk or coating.

Another possible application in coatings would be the use of new dendrimers, based on the use of the polymer with hydroxyl functionality at the termini thereof to form the core for dendritic hybrid macromolecules based on condensation or addition polymerizations, utilizing the hydroxyl functionality as the initiating site (see, for example Gitsov and Frechet, American Chemical Society PMSE Preprints, Volume 73, August 1995.

Yet another application includes use as toughening polymers for epoxy composites, utilizing the polymer core with the hydroxyl groups converted to half esters by reaction with anhydrides. These epoxy reactive polymers can then be utilized as reactants with epoxy resins and amines in composite systems. Reacting the hydroxyl functional polymers into unsaturated polyesters provides a new polymer toughening system for polyester molding compounds for automotive and other uses. For a review of the use of linear polymers for toughening of epoxies and polyesters, see "Rubber-Toughened Plastics", Edited By C. Keith Riew, ACS Advances in Chemistry Series, #222.

Cathodic electrodepositable coatings may be prepared from epoxy functional polymers described above by reacting with epoxy resins in the presence of excess amine or polyamine, to completely react all the epoxy groups, distilling off excess amine, and neutralizing the resulting epoxy-amine adduct with water soluble organic or inorganic acids to form water soluble, quarternary ammonium containing polymer salts (see for reference, U.S. Pat. Nos. 3,617,458, 3,619,398, 3,682,814, 3,891,527, 3,947,348, and 4,093,594). Alternatively, the above epoxy-amine polymer adducts may be converted to quaternary phosphonium or sulfonium ion containing polymers, as described in U.S. Pat. No. 3,935,087.

An acrylate-terminated prepolymer curable by free-radical processes can be prepared from the hydrogenated (VI) polymer by reaction with a diisocyanate (2NCO/OH) followed by further reaction with hydroxyethyl acrylate in the presence of a basic reagent.

Another likely application for hetero-telechelic terminated polymers include use as viscosity index (I.V.) improvers. Using carboxyl functional monomers, such as acrylic acid and methacrylic acid, and/or amine functional monomers such as acrylamide, along with free radical initiators in further polymerizations, can result in the formation of polymer segments at the periphery of each termini with amine or other functionalities which, in addition to the advantageous properties of the polymers as V.I. improvers, combines the ability to add functionality to the polymers for dispersant properties (see, for example, U.S. Pat. Nos. 5,496,898, 4,575,530, 4,486,573, 5,290,874, 5,290,868, 4,246,374 and 5,272,211).

The versatility of the hydroxyl functional polymers of this invention, and the wide range of different segmented polymers (polyethers, polyesters, polyamides, polycarbonates, polyurethanes, etc.) which can be initiated at the hydroxyl groups, leads to numerous possible applications as compatibilizers for polymer blends and alloys. In addition to the use of such blends for new applications, much recent interest is generated in the use of compatibilizers to facilitate polymer waste recycling.

The polar functional groups of the polymer chain ends allow the polymers of this invention to alter the surface properties of polymers like polyethylene (including high density polyethylene, low density polyethylene and linear low density polyethylene), polypropylene, polyisobutylene and copolymers and blends thereof. When the polymers of this invention are blended with non-polar polyolefins, the polar functional groups on the chain ends, being incompatible with the non-polar polyolefin, will phase separate and migrate to the surface of the polyolefin. The functional polymers of the invention can be added in amounts ranging from 1 to 25% by weight based on the weight of the polyolefin. Properties such as surface adhesion are thus greatly enhanced, leading to improved adhesion of pigments in printing inks for labels, composite layering, and other adhesive applications. An alternative approach to modification of polymer surfaces to alter properties by introduction of functional groups has been the use of chemical reagents such as alkyllithiums (see, for example, A. J. Dias, K-W Lee, and T. J. McCarthy, Rubber & Plastics News, 18–20, Oct. 31, 1988, and A. J. Dias and T. J. McCarthy, Macromolecules, 20, 1437 (1987).

Alternatively, protecting groups may be removed, either before or after optional hydrogenation of the aliphatic unsaturation, then the hydroxy terminated polymer may be reacted with functional comonomers to produce novel copolymers using these and other processes. Thus, for example, a hydroxy terminated polymer may be hydrogenated, and then reacted with ethylene oxide in the presence of potassium tert-butoxide to produce a poly(ethylene oxide)-hydrogenated block copolymer. This reaction sequence affords a hydrogel.

Alternatively, the protected monohydroxy terminated polymer (V) may be reacted with functional comonomers, without simultaneously removing the protective group. These copolymers then may be deprotected and then further reacted with the same or different comonomers to form yet other novel copolymers. Thus, for example, the hydroxyterminated polymer of Formula (V) may be hydrogenated, and then reacted with ethylene oxide in the presence of potassium tert-butoxide to produce a poly(ethylene oxide)-hydrogenated polybutadiene copolymer with one protected thiol group on the polybutadiene segment. This thiol can then be deprotected and a poly(ethylene oxide) polymer having different chain lengths grown onto both ends of the polybutadiene segment.

In another possible application, the living polymer (IV) may be reacted with an alkenylarylhalosilane, such as styrenyldimethylchlorosilane, to yield the corresponding omega-styrenyl terminated macromonomer according to the teachings of U.S. Pat. No. 5,278,244, which may then be further polymerized by a variety of techniques to yield "comb" polymers which, on deprotection and hydrogenation yield branched polymers with hydroxyfunctionality on the branch-ends. Such multi-functionality can be utilized to graft a water-soluble polymer such as polyethylene oxide onto a hydrophobic polyolefinic core to produce hydrogels.

In still another possible application, hydrogenated hydroxyterminated branches of the polymers may be further reacted with acryloyl chloride or methacryloyl chloride, and the resultant acrylate or methacrylate-terminated polymer further polymerized with monomers selected from the group of alkyl acrylates, alkyl methacrylates, and dialkylacrylamides to produce hydrogels. Further, acrylate or methacrylate-terminated polymers may be polymerized by free-radical processes.

The following examples further illustrate the invention.

Preparation of the Initiators

EXAMPLE A

Preparation of 3-(t-Butyldimethylsilyloxy)-1-Propyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 5.20 grams (0.749 mole, 2.80 equivalents) was transferred to the flask with 260 ml cyclohexane. This suspension was stirred at 450 RPMs, and heated to 65° C. with a heating mantle. The heat source was removed. 1-(t-Butyldimethylsilyloxy)-3-chloropropane, 58.82 grams (0.268 mole, 1.00 equivalent) was added dropwise. An exotherm was detected after 31.8% of the feed had been added. A dry ice/hexane cooling bath was applied to maintain the reaction temperature at 60–65° C. The total feed time was one hundred five minutes. An exotherm was noted until the last drop of feed was added, then the temperature fell off rapidly to room temperature. The reaction mixture was stirred at room temperature for forty five minutes, then heated to 65° C. with a heating mantle. The heat source was removed. Isoprene, 36.45 grams (0.535 mole, 2.00 equivalents) was then added dropwise. An exotherm was noted after 24.6% of the feed had been added. Hexane cooling was applied to maintain the reaction temperature at 60–65° C. The total isoprene feed time was thirty eight minutes. The reaction mixture was allowed to stir at room temperature for one hour, then transferred to a small pressure filter with argon pressure. Very rapid filtration was observed with 2 psi argon. The muds were reslurried with cyclohexane (2×50 ml). This afforded an orange solution, yield=530 ml, 425.34 grams. Total base=17.1 wt. %; Active C—Li=15.9 wt %; Yield (based on active C—Li)=80.8%.

EXAMPLE B

Preparation of 3-(t-Butyldimethylsilylthio)-1-propyllithium Chain Extended with 2 Moles of Isoprene A 500 ml, three-necked Morton flask is equipped with a mechanical stirrer, a 125 ml pressure-equalizing addition funnel, and a Claisen adapter fitted with a thermocouple, a reflux condenser, and an argon inlet. This apparatus is dried in an oven overnight at 125° C., assembled hot, and allowed to cool to room temperature in a stream of argon. Lithium dispersion is washed free of mineral oil with hexane (2×70 ml), and pentane (1×70 ml), then dried in a stream of argon. The dry dispersion, 5.20 grams (0.749 mole, 2.80 equivalents) is transferred to the flask with 260 ml cyclohexane. This suspension is stirred at 450 RPMs, and heated to 65° C. with a heating mantle. The heat source is removed. 1-(t-Butyldimethylsilylthio)-3-chloro-propane, 60.22 grams (0.268 mole, 1.00 equivalent) is added dropwise. An exotherm is detected after 21.8% of the feed has been added. A dry ice/hexane cooling bath is applied to maintain the reaction temperature at 60–65° C. The total feed time is one hundred minutes. An exotherm is noted until the last drop of feed is added, then the temperature falls off rapidly to room temperature. The reaction mixture is stirred at room temperature for forty five minutes, then heated to 65° C. with a heating mantle. The heat source is removed. Isoprene, 36.45 grams (0.535 mole, 2.00 equivalents) is then added dropwise. An exotherm is noted after 24.6% of the feed has been added. Hexane cooling is applied to maintain the reaction temperature at 60–65° C. The total isoprene feed time is thirty eight minutes. The reaction mixture is allowed to stir at room temperature for one hour, then transferred to a small pressure filter with argon pressure. Very rapid filtration is achieved with 2 psi argon. The muds are reslurried with cyclohexane (2×50 ml). This affords an orange solution; yield=530 ml, 435.21 grams. Total base=17.7 wt. %; Active C—Li=16.9 wt %; Yield (based on active C—Li)=82.4%.

EXAMPLE C

Preparation of 3-(N,N-Dimethylamino)-1-propyllithium Chain Extended with 2 Moles of Isoprene A 500 ml, three-necked Morton flask was equipped with a mechanical stirrer, a 125 ml pressure-equalizing addition funnel, and a Claisen adapter fitted with a thermocouple, a reflux condenser, and an argon inlet. This apparatus was dried in an oven overnight at 125° C., assembled hot, and allowed to cool to room temperature in a stream of argon. Lithium dispersion was washed free of mineral oil with hexane (2×70 ml), and pentane (1×70 ml), then dried in a stream of argon. The dry dispersion, 10.57 grams (1.520 moles) was transferred to the flask with 250 ml cyclohexane. Coarse sand, 45.3 grams, was added to the reaction mixture. This suspension was stirred at 600–675 RPMs, and heated to 37° C. with a heating mantle. The heat source was removed. 1-Chloro-3-(N,N-dimethylamino)propane, 19.64 grams (0.1615 mole) dissolved in 120 ml. Cyclohexane was added dropwise. An exotherm (up to 52° C.) was detected after 7% of the feed had been added. A dry ice/hexane cooling bath was applied to maintain the reaction temperature at 41–44° C. The total feed time was thirty-two minutes. An exotherm was noted until the last drop of feed was added, then the temperature was maintained at 36–40° C. for an additional thirty minutes. The reaction mixture was then transferred to a sintered glass filter while still warm. The filtration was complete in three minutes with three psi argon pressure. This afforded a hazy suspension. Yield=400 ml, 298.2 grams. Active C—Li=0.361 M (0.469 m/kg) at 40° C. Yield (based on active C—Li=87%.

The product crystallized from solution upon standing at room temperature. The concentration of the clear supernatant solution was about 0.3 M.

A dry 500 ml round bottom flask was fitted with a magnetic stir bar, and an argon inlet. This apparatus was purged with argon, then 154.77 grams (0.0726 mole) of the suspension prepared above was added to the flask. Isoprene, 9.4 grams (0.138 mole, 1.90 equivalents) was then added all at once. The reaction mixture was then heated to 48–49° C. for forty minutes. This afforded a slightly hazy golden solution, which was partially vacuum-stripped on the rotary evaporator to afford the product solution. Yield=43.32 grams. Active C—Li=1.36 M (1.65 m/kg). Recovered yield (based on active C—Li)=98.5%.

Examples of the Invention—Preparation of Polymers

EXAMPLE 1

Hetero-telechelic Polyisoprene with Tertiary Amine Functional Group at the $\overline{\omega}$-Chain End Isoprene and cyclohexane were purified according to the conventional methods for anionic polymerization. Solutions of 3-(1,1-dimethyl ethoxy)-1-propyllithium, chain extended with two moles of isoprene, which has t-butoxy group at the chain end, was injected into the reactor in the amount of 25.8 ml ($7.74 \times 10^{-3}$ M). Purified 450 ml of cyclohexane was distilled into the reactor and then reactor was flame sealed off. After the adding the monomer into the reactor by breaking the break-seal for the ampoule containing 38 ml of purified isoprene, the reaction proceeded for eight hours at room temperature. An ampoule of 260 ml of living poly (isoprenyl)lithium was sealed off for further functionalization reaction and the small amount of residual polymer solution was terminated by degassed methanol for the determination of molecular weight. This 260 ml of polyisoprenyllithium solution which has $4.47 \times 10^{-3}$ M of living chain ends was deactivated by 1.5-molar excess ($6.71 \times 10^{-3}$ M) of 3-(dimethylamino)propyl chloride(DMAPC) which was prepared by the neutralization of DMAPC.HCl by sodium hydroxide in water. DMAPC was stirred over calcium hydride for several hours before distillation into the ampoule. After termination with degassed methanol, polyisoprene was isolated into a large amount of methanol. Molecular weight and polydispersity were determined by SEC as $M_n$=3150 g/mol and $M_w/M_n$=1.06. By TLC analysis using toluene as an eluent, small amount of unfunctionalized polymer was detected and separated by silica gel column chromatography. It was characterized by titration and $^1$H-NMR ($\delta$=2.20 ppm) and the pure dimethylamino-functionalized polyisoprene was isolated in 85% yield by silica gel column chromatography.

EXAMPLE 2

Hetero-telechelic Polystyrene with Sulfonated Functional Group at the $\overline{\omega}$-Chain End Styrene and benzene were purified as described previously. 16.7 ml solution of 3-(tert-amyloxy)-1-propyllithium, chain extended with two moles of isoprene, which has t-amyloxy group at the chain end in cyclohexane (5.0×10$^{-3}$ M) was injected into the reactor. After distillating 200 ml of benzene into the reactor, the purified styrene monomer was added to solution by breaking the breakseal. Living polystyryllithum was end-capped with 1.5 molar excess (4.0 mmol) of 1,1-diphenylethylene and the crossover reaction, monitored by UV/Vis spectroscopy, was complete in an hour. A 1:6 (v/v) ratio of THF/benzene solution of a 1.5 molar excess (4.0 mmol) of 1,3-propane sultone was added to the living polystyryllithium which was end-capped with 1,1-diphenylethylene. The molecular weight of the base polymer which was obtained by termination with degassed methanol before the functionalization was 3,100 g/mol from the SEC with 1.18 of polydispersity. After the silica gel column chromatography separation, the functionality of the ω-sulfonated polystyrene obtained was over 90%.

Table 1 below sets forth information relating to the polymers prepared as described above in Examples 1 and 2, as well as additional information relating to other proposed polymers in accordance with the invention.

TABLE 1

| Polymer | Initiator Functionality | Terminating Agent | Polymer Functionality | Molecular Weight ($M_n$) | Polydispersity ($M_w/M_n$) | Functionality (%) |
|---|---|---|---|---|---|---|
| PS[1] | X—SH[2] | ethylene oxide | HS—OH | 4,100 | 1.17 | >90 |
| PI[3] | X'—SH[4] | ethylene oxide | HS—OH | 6,910 | 1.08 | >90 |
| PI | X—SH | $CO_2$ | HS—COOH | 7,420 | 1.07 | >90 |
| PI | X—OH | DMAPC[5] | HO—N(CH$_3$)$_2$ | 3,150 | 1.06 | 85 |
| PI | X'—OH | 1,3-propane sultone | HO—SO$_3$H | 2,200 | 1.06 | 93 |
| PS | X'—OH | NBTSA[6] | HO—NH$_2$ | 3,100 | 1.18 | >90 |
| PS | X—OH | $CO_2$ | HO—COOH | 2,000 | <1.1 | >90 |
| PI | X—OH | $CO_2$ | HO—COOH | 2,000 | <1.1 | >90 |

Notes:
[1]PS is polystyrene.
[2]X represents t-butyl group from initiator.
[3]PI is polyisoprene.
[4]X' represents t-amyl group from initiator.
[5]DMAPC is 3-(dimethylamino) propyl chloride.
[6]NBTSA is N-(benzylidene) trimethylsilylamine.

The foregoing examples are illustrative of the present invention and are not to be construed as limiting thereof. The invention is defined by the following claims, with equivalents of the claims to be included therein.

That which is claimed is:

1. A heterotelechelic polymer having the formula:

$$FG\text{—}(Q)_d\text{—}Z\text{—}J\text{—}[A(R^1R^2R^3)]_x \qquad (I)$$

wherein:
FG is a protected or non-protected functional group;
Q is a saturated or unsaturated hydrocarbyl group derived by incorporation of a compound selected from the group consisting of conjugated diene hydrocarbons, alkenylsubstituted aromatic hydrocarbons, 2-vinylpyridine, 4-vinylpyridine, and mixtures thereof;
d is an integer from 10 to 2000;
Z is a branched or straight chain hydrocarbon group which contains 3–25 carbon atoms, optionally containing aryl or substituted aryl groups;
J is sulfur or nitrogen;
[A(R$^1$R$^2$R$^3$)]$_x$ is a protecting group, wherein A is an element selected from Group IVa of the Periodic Table of Elements; R$^1$, R$^2$, and R$^3$ are each independently selected from the group consisting of hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; and x is dependent on the valence of J and varies from one when J is sulfur to two when J is nitrogen, with the proviso J—[A(R$^1$R$^2$R$^3$)]$_x$ and FG are not the same.

2. A process for preparing heterotelechelic polymer having mixed functional ends, comprising:
polymerizing a monomer selected from conjugated diene hydrocarbons, alkenylsubstituted aromatic hydrocarbons, 2-vinylpyridine, 4-vinylpyridine, and mixtures thereof, with a protected functional organometallic initiator of the formula $$M\text{—}Q_n\text{—}Z\text{—}J\text{—}[A(R^1R^2R^3)]_x \qquad (II)$$

wherein:
M is an alkali metal;
Q is a saturated or unsaturated hydrocarbyl group derived by incorporation of a compound selected from the group consisting of conjugated diene hydrocarbons, alkenylsubstituted aromatic hydrocarbons, 2-vinylpyridine, 4-vinylpyridine, and mixtures thereof;
n is an integer from 0 to 5;
Z is a branched or straight chain hydrocarbon group which contains 3–25 carbon atoms, optionally containing aryl or substituted aryl groups;
J is sulfur or nitrogen;
[A(R$^1$R$^2$R$^3$)]$_x$ is a protecting group in which A is an element selected from Group IVa of the Periodic Table of Elements; R$^1$, R$^2$, and R$^3$ are independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; and x is dependent on the valence of J and varies from one when J is sulfur to two when J is nitrogen, to form a mono-protected, monofunctionalized living polymer; and functionalizing said living polymer with a functionalizing compound capable of terminating or end-capping a living polymer to provide a di-functional polymer, with the proviso that J—[A(R$^1$R$^2$R$^3$)]$_x$ of the initiator and the functionalizing compound differ to provide a heterotelechelic polymer.

3. A polymer having mixed functional ends produced by polymerizing a monomer selected from conjugated diene hydrocarbons, alkenylsubstituted aromatic hydrocarbons, 2-vinylpyridine, 4-vinylpyridine, and mixtures thereof, with a protected functional organometallic initiator of the formula

$$M-Q_n-Z-J-[A(R^1R^2R^3)]_x \quad (II)$$

wherein:

M is an alkali metal;

Q is a saturated or unsaturated hydrocarbyl group derived by incorporation of a compound selected from the group consisting of conjugated diene hydrocarbons, alkenylsubstituted aromatic hydrocarbons, 2-vinylpyridine, 4-vinylpyridine, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen;

A is an element selected from Group IVa of the Periodic Table of Elements;

R$^1$, R$^2$, and R$^3$ are independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer, followed by functionalizing the living polymer with a protected or non-protected functionalizing compound capable of terminating or end-capping a living polymer to provide a di-functional polymer, with the proviso that the initiator and the functionalizing compound contain different functional groups to provide a hetero-telechelic polymer;

deprotecting at least one or both of said functional groups, wherein said deprotected polymer includes at least one hydroxyl functional group; and reacting said at least one hydroxyl functional group with sulfonyl chloride in the presence of a tertiary amine catalyst to form sulfonate functional groups at the terminus thereof.

4. The polymer of claim 3, wherein said sulfonate functional groups are reacted with primary amines or ammonia, under heat and pressure, to form polymers with amine functionality at the terminus thereof.

5. A polymer having mixed functional ends produced by polymerizing a monomer selected from conjugated diene hydrocarbons, alkenylsubstituted aromatic hydrocarbons, 2-vinylpyridine, 4-vinylpyridine, and mixtures thereof, with a protected functional organometallic initiator of the formula

$$M-Q_n-Z-J-[A(R^1R^2R^3)]_x \quad (II)$$

wherein:

M is an alkali metal;

Q is a saturated or unsaturated hydrocarbyl group derived by incorporation of a compound selected from the group consisting of conjugated diene hydrocarbons, alkenylsubstituted aromatic hydrocarbons, 2-vinylpyridine, 4-vinylpyridine, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen;

A is an element selected from Group IVa of the Periodic Table of Elements;

R$^1$, R$^2$, and R$^3$ are independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer, followed by functionalizing the living polymer with a protected or non-protected functionalizing compound capable of terminating or end-capping a living polymer to provide a di-functional polymer, with the proviso that the initiator and the functionalizing compound contain different functional groups to provide a hetero-telechelic polymer;

deprotecting at least one or both of said functional groups, wherein said deprotected polymer includes at least one hydroxyl functional group;

reacting said at least one hydroxyl functional group with anhydride to form a half-ester with free carboxyl functionality at the terminus thereof; and reacting said carboxyl functional groups with an epoxy resin and an excess of amine to completely react all of the epoxy groups, removing excess amine, and reacting the resulting epoxy-amine adduct with a water soluble organic or inorganic acid to form water soluble quarternary ammonium containing polymers.

6. A process for modifying the surface adhesion properties of polyolefins, comprising melt mixing a polymer having the formula:

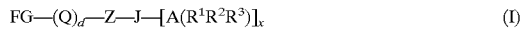

$$FG-(Q)_d-Z-J-[A(R^1R^2R^3)]_x \quad (I)$$

wherein:

FG is a protected or non-protected functional group;

Q is a saturated or unsaturated hydrocarbyl group derived by incorporation of a compound selected from the group consisting of conjugated diene hydrocarbons, alkenylsubstituted aromatic hydrocarbons, 2-vinylpyridine, 4-vinylpyridine, and mixtures thereof;

d is an integer from 10 to 2000;

Z is a branched or straight chain hydrocarbon group which contains 3–25 carbon atoms, optionally containing aryl or substituted aryl groups;

J is oxygen, sulfur, or nitrogen;

[A(R$^1$R$^2$R$^3$)]$_x$ is a protecting group, wherein

A is an element selected from Group IVa of the Periodic Table of Elements;

R¹, R², and R³ are each independently selected from the group consisting of hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; and x is dependent on the valence of J and varies from one when J is oxygen or sulfur to two when J is nitrogen, with the proviso J and FG are not the same, with a polyolefin in an amount of 1 to 25% by weight based on the polyolefin.

7. The process of claim 6, wherein the polyolefin is selected from the group consisting of low density polyethylene, linear low density polyethylene, high density polyethylene, polypropylene, polyisobutylene and copolymers and blends thereof.

8. A polymer having mixed functional ends produced by polymerizing a monomer selected from conjugated diene hydrocarbons, alkenylsubstituted aromatic hydrocarbons, 2-vinylpyridine, 4-vinylpyridine, and mixtures thereof, with a protected functional organometallic initiator of the formula

wherein:

M is an alkali metal;

Q is a saturated or unsaturated hydrocarbyl group derived by incorporation of a compound selected from the group consisting of conjugated diene hydrocarbons, alkenylsubstituted aromatic hydrocarbons, 2-vinylpyridine, 4-vinylpyridine, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen;

$[A(R^1R^2R^3)]_x$ is a protecting group in which A is an element selected from Group IVa of the Periodic Table of Elements;

R¹, R², and R³ are independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer, followed by functionalizing the living polymer with a protected or non-protected functionalizing compound capable of terminating or end-capping a living polymer to provide a di-functional polymer, with the proviso that the initiator and the functionalizing compound contain different functional groups to provide a heterotelechelic polymer;

deprotecting at least one or both of said functional groups, wherein said deprotected polymer includes at least one hydroxyl functional group;

reacting said at least one hydroxyl functional group with anhydride to form a half-ester with free carboxyl functionality at the terminus thereof; and reacting said carboxyl functional terminal groups with epoxy resins and amine curing agents to form epoxy resin composites.

9. A polymer having mixed functional ends produced by polymerizing a monomer selected from conjugated diene hydrocarbons, alkenylsubstituted aromatic hydrocarbons, 2-vinylpyridine, 4-vinylpyridine, and mixtures thereof, with a protected functional organometallic initiator of the formula

wherein:

M is an alkali metal;

Q is a saturated or unsaturated hydrocarbyl group derived by incorporation of a compound selected from the group consisting of conjugated diene hydrocarbons, alkenylsubstituted aromatic hydrocarbons, 2-vinylpyridine, 4-vinylpyridine, and mixtures thereof;

n is an integer from 0 to 5;

Z is a branched or straight chain hydrocarbon group which contains 3–25 carbon atoms, optionally containing aryl or substituted aryl groups;

J is oxygen, sulfur, or nitrogen;

$[A(R^1R^2R^3)]_x$ is a protecting group in which A is an element selected from Group IVa of the Periodic Table of Elements;

R¹, R², and R³ are independently selected from hydrogen, alkyl, substituted alkyl groups containing lower alkyl, lower alkylthio, and lower dialkylamino groups, aryl, substituted aryl groups containing lower alkyl, lower alkylthio, and lower dialkylamino groups, cycloalkyl and substituted cycloalkyl containing 5 to 12 carbon atoms; and x is dependent on the valence of J and varies from one when J is oxygen or sulfur to two when J is nitrogen, to form a mono-protected, mono-functionalized living polymer, followed by functionalizing the living polymer with a protected or non-protected functionalizing compound capable of terminating or end-capping a living polymer to provide a di-functional polymer, with the proviso that the initiator and the functionalizing compound contain different functional groups to provide a heterotelechelic polymer;

deprotecting at least one or both of said functional groups, wherein said deprotected polymer includes at least one hydroxyl functional group;

reacting said at least one hydroxyl functional group with methacryloyl or acryloyl chloride to provide polymerizable alkenyl groups at the terminus thereof; and polymerizing sulfonated styrene and/or 4-vinyl pyridine by free radical initiators onto said terminal alkenyl groups to provide functional polymer segments capable of improving dispersability of the polymer.

10. The polymer of claim 1, wherein said functional group is selected from the group consisting of hydroxyl, thio, amino, carboxyl, amide, silyl, acrylate, sulfonic acid, isocyanate, and epoxide.

11. The polymer of claim 1, wherein:

said conjugated diene hydrocarbon is selected from the group consisting of 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene; and said alkenylsubstituted aromatic hydrocarbon is selected from the group consisting of styrene, alpha-methylstyrene, vinyltoluene, 1-vinylnaphthalene, 2-vinylnaphthalene, 1-alpha-methylvinylnaphthalene, 2-alpha-methylvinylnaphthalene, 1,2-diphenyl-4-methyl-1-hexene, and mixtures of these and alkyl, cycloalkyl, aryl, alkylaryl and arylalkyl derivatives thereof in which the total number of carbon atoms in the combined hydrocarbon constituents is not greater than 18.

12. The polymer of claim 1, wherein A is carbon or silicon.

13. The polymer of claim 1, wherein at least a portion of aliphatic unsaturation of said polymer has been saturated with hydrogen.

14. The polymer of claim 13, wherein at least about 90% of the aliphatic unsaturation has been saturated with hydrogen.

15. The process of claim 2, wherein:
said conjugated diene hydrocarbon is selected from the group consisting of 1,3-butadiene, isoprene, 2,3-dimethyl-1,3-butadiene, 1,3-pentadiene, myrcene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene; and
said alkenylsubstituted aromatic hydrocarbon is selected from the group consisting of styrene, alpha-methylstyrene, vinyltoluene, 1-vinylnaphthalene, 2-vinylnaphthalene, 1-alpha-methylvinylnaphthalene, 2-alpha-methylvinylnaphthalene, 1,2-diphenyl-4-methyl-1-hexene, and mixtures of these and alkyl, cycloalkyl, aryl, alkylaryl and arylalkyl derivatives thereof in which the total number of carbon atoms in the combined hydrocarbon constituents is not greater than 18.

16. The process of claim 2, wherein A is carbon or silicon.

17. The process of claim 2, further comprising saturating at least a portion of aliphatic unsaturation of said hetero-telechelic polymer with hydrogen after said polymerizing step.

18. The process of claim 17, wherein said saturating step comprises saturating at least about 90% of the aliphatic unsaturation with hydrogen.

19. The process of claim 17, wherein said process further comprises removing at least one protecting group from said polymer after said saturating step.

20. The process of claim 17, further comprising removing at least one protecting group from said polymer prior to said saturating step.

21. The process of claim 2, further comprising deprotecting at least one of said functional ends of said hetero-telechelic polymer.

22. The process of claim 2, wherein said functionalizing step comprises functionalizing said living polymer with a functionalizing compound selected from the group consisting of ethylene oxide, propylene oxide, styrene oxide, oxetane, oxygen, sulfur, carbon dioxide, chlorine, bromine, iodine, chlorotrimethylsilane, styrenyldimethyl chlorosilane, 1,3-propane sultone, caprolactam, N-benzylidene trimethylsilylamide, dimethyl formamide, silicon acetals, 1,5-diazabicyclo[3.1.0]hexane, allyl bromide, allyl chloride, methacryloyl chloride, 3-(dimethylamino)-propyl chloride, N-(benzylidene) trimethylsilylamine, epichlorohydrin, epibromohydrin, and epiiodohydrin.

23. The process of claim 2, wherein said organometallic initiator is selected from the group consisting of omega-(tert-alkylthio)-1-alkyllithiums, omega-(tert-alkylthio)-1-alkyllithiums chain extended with conjugated alkadienes, alkenylsubstituted aromatic hydrocarbons, and mixtures thereof, omega-(tert-butyldimethylsilylthio)-1-alkyllithiums, omega-(dialkylamino)-1-alkyllithiums, omega-(dialkylamino)-1-alkyllithiums chain-extended with conjugated alkadienes, alkenylsubstituted aromatic hydrocarbons, and mixtures thereof, and omega-(bis-tert-alkylsilylamino)-1-alkyllithiums.

24. The process of claim 23, wherein said organometallic initiator is selected from the group consisting of 3-(1,1-dimethylethylthio)-1-propyllithium, 3-(dimethylamino)-1-propyllithium, 3-(di-tert-butyldimethylsilylamino)-1-propyllithium, 3-(dimethylamino)-1-propyllithium, 3-(dimethylamino)-2-methyl-1-propyllithium, 3-(dimethylamino)-2,2-dimethyl-1-propyllithium, 4-(dimethylamino)-1-butyllithium, 5-(dimethylamino)-1-pentyllithium, 6-(dimethylamino)-1-hexyllithium, 8-(dimethylamino)-1-propyllithium, 3-(hexamethyleneimino)-1-propyllithium, 4-(hexamethyleneimino)-1-butyllithium, 5-(hexamethyleneimino)-1-pentyllithium, 6-(hexamethyleneimino)-1-hexyllithium, 8-(hexamethyleneimino)-1-octyllithium, 3-(t-butyldimethylsilylthio)-1-propyllithium, 3-(t-butyldimethylsilylthio)-2-methyl-1-propyllithium, 3-(t-butyldimethylsilylthio)-2,2-dimethyl-1-propyllithium, 4-(t-butyldimethylsilylthio)-1-butyllithium, 6-(t-butyldimethylsilylthio)-1-hexyllithium, 3-(trimethylsilylthio)-2,2-dimethyl-1-propyllithium, 3-(1,1-dimethylethylthio)-1-propyllithium, 3-(1,1-dimethylethylthio)-2-methyl-1-propyllithium, 3-(1,1-dimethylethylthio)-2,2-dimethyl-1-propyllithium, 4-(1,1-dimethylethylthio)-1-butyllithium, 5-(1,1-dimethylethylthio)-1-pentyllithium, 6-(1,1-dimethylethylthio)-1-hexyllithium, 8-(1,1-dimethylethylthio)-1-octyllithium, 3-(1,1-dimethylpropylthio)-1-propyllithium, 3-(1,1-dimethylpropylthio)-2-methyl-1-propyllithium, 3-(1,1-dimethylpropylthio)-2,2-dimethyl-1-propyllithium, 4-(1,1-dimethylpropylthio)-1-butyllithium, 5-(1,1-dimethylpropylthio)-1-pentyllithium, 6-(1,1-dimethylpropylthio)-1-hexyllithium, and 8-(1,1-dimethylpropylthio)-1-octyllithium, chain extended oligomeric analogs thereof chain extended with a hydrocarbyl group derived by incorporation of a compound selected from the group consisting of alkadienes, alkenylsubstituted aromatic hydrocarbons, and mixtures thereof.

25. The process of claim 2, wherein said polymerizing step comprises polymerizing said diene hydrocarbons or said alkenylsubstituted aromatic hydrocarbons singly, sequentially, or as mixtures thereof.

26. The process of claim 2, further comprising copolymerizing at least one of said functional groups of said hetero-telechelic polymer with at least one comonomer after said functionalizing step to form a copolymer.

27. The process of claim 26, wherein said comonomer is selected from the group consisting of lactams, cyclic ethers, diamines, diisocyanates, polyisocyanates, diamides, polyamides, cyclic amides, dicarboxylic acids, polycarboxylic acids, diols, polyols, anhydrides, and mixtures thereof.

28. The process of claim 26, wherein said copolymerizing step comprises reacting said polymer with one or more comonomers under conditions sufficient to deprotect said polymer and to polymerize said one or more comonomers at both functional ends of said deprotected polymer.

29. The process of claim 28, wherein said reacting step comprises reacting said polymer and said one or more comonomers in the presence of a strong acid catalyst.

30. The process of claim 26, wherein said copolymerizing step comprises reacting said polymer with one or more comonomers under conditions sufficient to maintain the integrity of at least one protective group of said polymer to provide at least one deprotected functional end and to polymerize said one or more comonomers at said at least one deprotected functional end of said polymer.

31. The process of claim 30, further comprising deprotecting said protected functional end.

32. The process of claim 30, further comprising reacting said copolymer with a comonomer.

* * * * *